(12) United States Patent  
Stanton et al.

(10) Patent No.: US 11,809,393 B2  
(45) Date of Patent: Nov. 7, 2023

(54) IMAGE AND TEXT DATA HIERARCHICAL CLASSIFIERS

(71) Applicant: Etsy, Inc., Brooklyn, NY (US)

(72) Inventors: Andrew Stanton, San Francisco, CA (US); Nikhil Raghavan, Menlo Park, CA (US); Manjunath Rajashekhar, Menlo Park, CA (US); Devin Guillory, San Francisco, CA (US)

(73) Assignee: Etsy, Inc., Brooklyn, NY (US)

( * ) Notice: Subject to any disclaimer, the term of this patent is extended or adjusted under 35 U.S.C. 154(b) by 41 days.

(21) Appl. No.: 16/799,292

(22) Filed: Feb. 24, 2020

(65) Prior Publication Data

US 2020/0210396 A1  Jul. 2, 2020

Related U.S. Application Data

(63) Continuation of application No. 14/866,554, filed on Sep. 25, 2015, now abandoned.

(Continued)

(51) Int. Cl.
*G06F 16/22* (2019.01)
*G06F 16/951* (2019.01)

(Continued)

(52) U.S. Cl.
CPC ...... *G06F 16/2228* (2019.01); *G06F 16/2453* (2019.01); *G06F 16/41* (2019.01); *G06F 16/951* (2019.01); *G06N 3/045* (2023.01); *G06N 3/08* (2013.01); *G06N 3/044* (2023.01); *G06N 3/084* (2013.01)

(58) Field of Classification Search
CPC .. G06F 16/2228; G06F 16/2453; G06F 16/41; G06F 16/951; G06F 16/953; G06F 16/9532; G06F 16/9538; G06N 3/0454; G06N 3/08; G06N 3/0445; G06N 3/084; G06N 3/045; G06N 3/0455; G06N 3/0895; G06N 3/09; G06N 3/091; G06N 3/092;

(Continued)

(56) References Cited

U.S. PATENT DOCUMENTS

2003/0187809 A1  10/2003  Suermondt
2005/0289473 A1* 12/2005  Gustafson ............. G06F 40/117
                                                                  715/275

(Continued)

FOREIGN PATENT DOCUMENTS

CN  102750541  10/2012
CN  103853792   6/2014

(Continued)

OTHER PUBLICATIONS

Cerri et al., "Hierarchical multi-label classification using local neural networks", Journal of Computer and System Sciences, 2014, 80:39-56.

(Continued)

*Primary Examiner* — Allen S Lin
(74) *Attorney, Agent, or Firm* — Fish & Richardson P.C.

(57) ABSTRACT

Indexing data is disclosed. An image and a text data associated with a dataset are received. A tag is generated using one or more hierarchical classifiers. The image and the text data are input into at least one of the one or more hierarchical classifiers. A search index is generated based at least on the generated tag.

20 Claims, 7 Drawing Sheets

Related U.S. Application Data (60) Provisional application No. 62/173,828, filed on Jun. 10, 2015.

(51) Int. Cl.

| | | |
|---|---|---|
| *G06F 16/2453* | (2019.01) | |
| *G06F 16/41* | (2019.01) | |
| *G06N 3/045* | (2023.01) | |
| *G06N 3/08* | (2023.01) | |
| G06N 3/084 | (2023.01) | |
| G06N 3/044 | (2023.01) | |

(58) Field of Classification Search
CPC ........ G06N 3/094; G06N 3/096; G06N 3/098; G06N 3/0985; G06N 3/044; G06N 3/0442
USPC ........................................ 707/715
See application file for complete search history.

(56) References Cited

U.S. PATENT DOCUMENTS

| | | | |
|---|---|---|---|
| 2006/0224533 A1* | 10/2006 | Thaler | G06N 3/0454 706/15 |
| 2008/0001014 A1 | 1/2008 | Spjut | |
| 2008/0140679 A1 | 6/2008 | Deyo | |
| 2009/0012991 A1* | 1/2009 | Johnson | G06F 16/24573 |
| 2011/0310113 A1 | 12/2011 | Dulaney et al. | |
| 2013/0198197 A1 | 8/2013 | Sawhney et al. | |
| 2014/0129981 A1* | 5/2014 | Soderberg | G06F 16/58 715/810 |
| 2014/0372378 A1 | 12/2014 | Long et al. | |
| 2016/0364419 A1 | 12/2016 | Stanton et al. | |

FOREIGN PATENT DOCUMENTS

| | | |
|---|---|---|
| CN | 104504109 | 4/2015 |
| CN | 104978328 | 10/2015 |
| EP | 2835748 | 2/2015 |

OTHER PUBLICATIONS

European Communication pursuant to Article 94(3) in European Application No. 16808133 dated Mar. 27, 2020, 10 pages.
Chinese Office Action in CN Appln. No. 20160033242.8, dated Nov. 3, 2020, 16 pages.
European Extended Search Report in European Application No. 16808133, dated Sep. 19, 2018, 9 pages.
International Preliminary Report on Patentability in International Application No. PCT/US2016/036244, dated Dec. 12, 2017, 6 pages.
International Search Report and Written Opinion in International Application No. PCT/US2016/036244, dated Sep. 1, 2016, 7 pages.
LeCun et al., "Deep learning." Nature, May 28, 2015, 521(7553):436-444.
Lu et al., "A Survey of Image Classification Methods and Techniques for Improving Classification Performance" International journal of Remote sensing, Mar. 10, 2007, 28(5):823-870.
Chinese Office Action in CN Appln. No. 201680033242.8, dated Jun. 29, 2021, 17 pages with English Translation.
Sonam, "Implementation of MD algorithm for text extraction from video," Presented at 2013 Nirma University International Conference on Engineering (NUiCONE), Ahmedabad, India, Nov. 28-30, 2013, 5 pages.
Supplemental Search Report in Chinese Appln. No. 201680033242. 8, dated Nov. 3, 2021, 1 page.
Zeng et al., "A text image classification research based on the underlying image feature combination," Journal of Jiangxi University of Science and Technology, Jun. 2013, 34(5):82-87, 13 pages (with English machine translation).
Extended European Search Report in European Appln. No. 22157799. 2, dated Jul. 11, 2022, 9 pages.

* cited by examiner

IMAGE AND TEXT DATA HIERARCHICAL CLASSIFIERS

CROSS REFERENCE TO OTHER APPLICATIONS

This application is a continuation of U.S. patent application Ser. No. 14/866,554, entitled "IMAGE AND TEXT DATA HIERARCHICAL CLASSIFIERS" filed Sep. 25, 2015, which claims priority to U.S. Provisional Patent Application No. 62/173,828 entitled "DEEP LEARNING SEARCH" filed Jun. 10, 2015, the contents of each are incorporated herein by reference herein in their entireties.

BACKGROUND OF THE INVENTION

When searching for information, search indexes are often utilized to speed up the search process. For example, content to be searched is preprocessed and select information about the content is stored in the search index. However, search results are often only as good as what is understood and indexed about the content being searched. For example, results of a search query are highly dependent on which information was able to be indexed for the content to be searched. Improving and increasing the range of information that is indexed would improve the accuracy and performance of search results.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
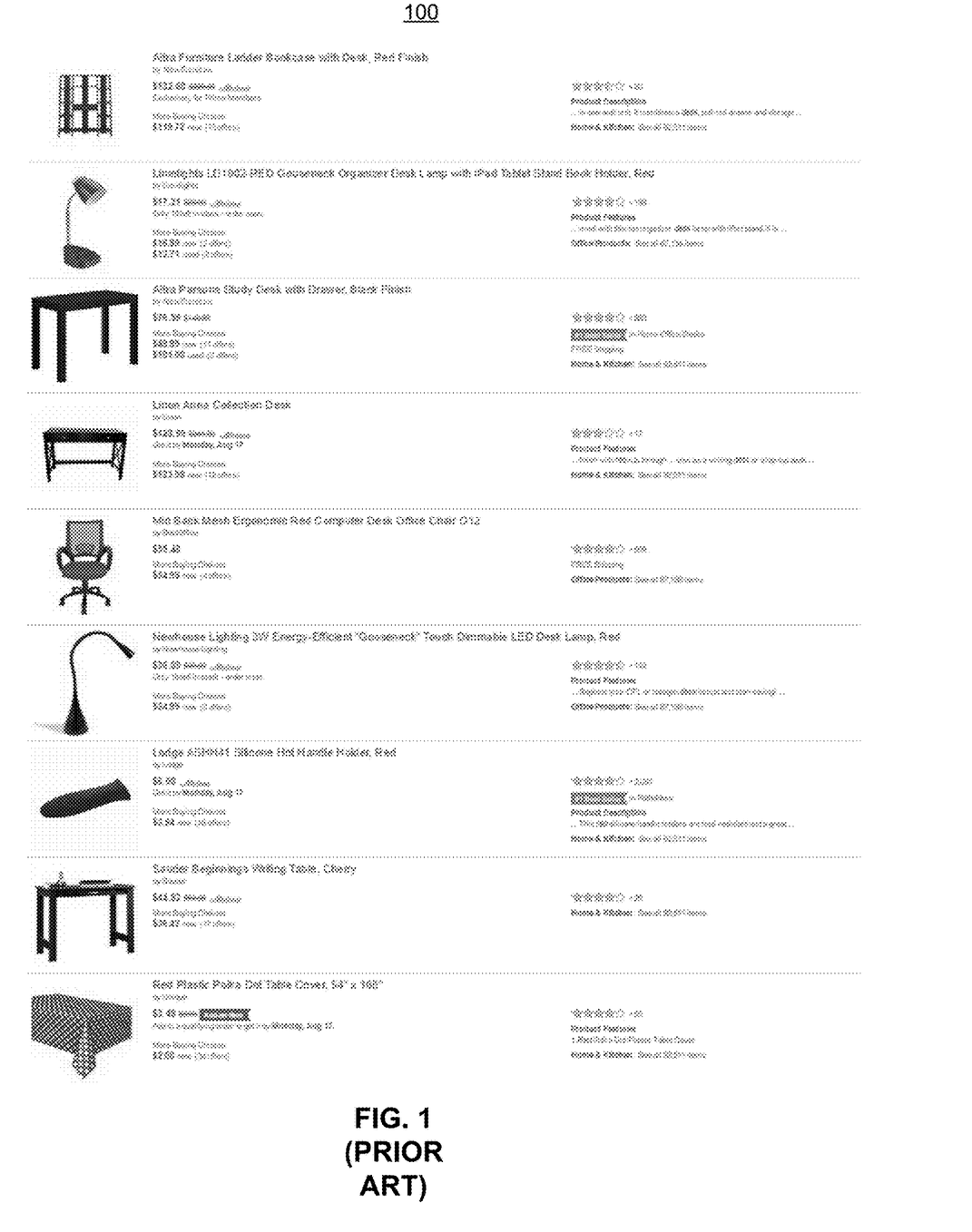
FIG. 1 is a screenshot illustrating a search result of a prior art search system.

FIG. 1 is a screenshot illustrating a search result of a prior art search system. In response to a search query to find all available items described as a "red desk" for sale on an online merchant website, search result 100 is provided by the prior art search system as the top search results. Even though the merchant sells a desk that is red in color, none of these top results are actually a desk that is red in color as intended by the search query. As evidenced by search results 100, these poor search results are likely due to use of a search index that did not include the relevant set of indexed terms. In some embodiments, in order to increase the amount of descriptive information available about a product, images of the product are processed using image recognition and additional tags to be included in a search index are generated. For example, the existence of a desk and its color are automatically recognized in an associated image of a product using image recognition and the recognized traits are associated with the product as tags.

Indexing datasets is disclosed. In some embodiments, image and text data associated with each dataset of a plurality of data sets are retrieved. For example, each dataset corresponds to a different product for sale and each dataset includes information about the corresponding product. Tags are generated using one or more hierarchical classifiers and the image and text data are input into one or more of the hierarchical classifiers. A search index of the datasets is generated using the generated tags.

For example, rather than merely indexing text information specified in the datasets, additional information about each dataset is generated for search indexing. In some embodiments, the image of a product is analyzed using image recognition, computer vision, and/or neural networks to identify tags/attributes about contents of the image. By deriving additional information about the datasets to be searched, the range of information able to be matched with each dataset is expanded. For example, although a dataset describing a dress clothing item identifies a single overall color of the dress in the text data record of the dataset, image recognition is performed on a photograph of the item (e.g., image recognition is guided by the text data) to identify additional colors or patterns on the item. In order to guide and improve performance of image recognition, text data (e.g., item title) included in a corresponding dataset is utilized. The text data and image data associated with the data may be jointly utilized in deep learning neural networks to improve the accuracy and detection of automatically generated descriptive tags of the dataset. Other examples of the dataset include advertisement data, video data, and any other content to be searched.

Figure 2:
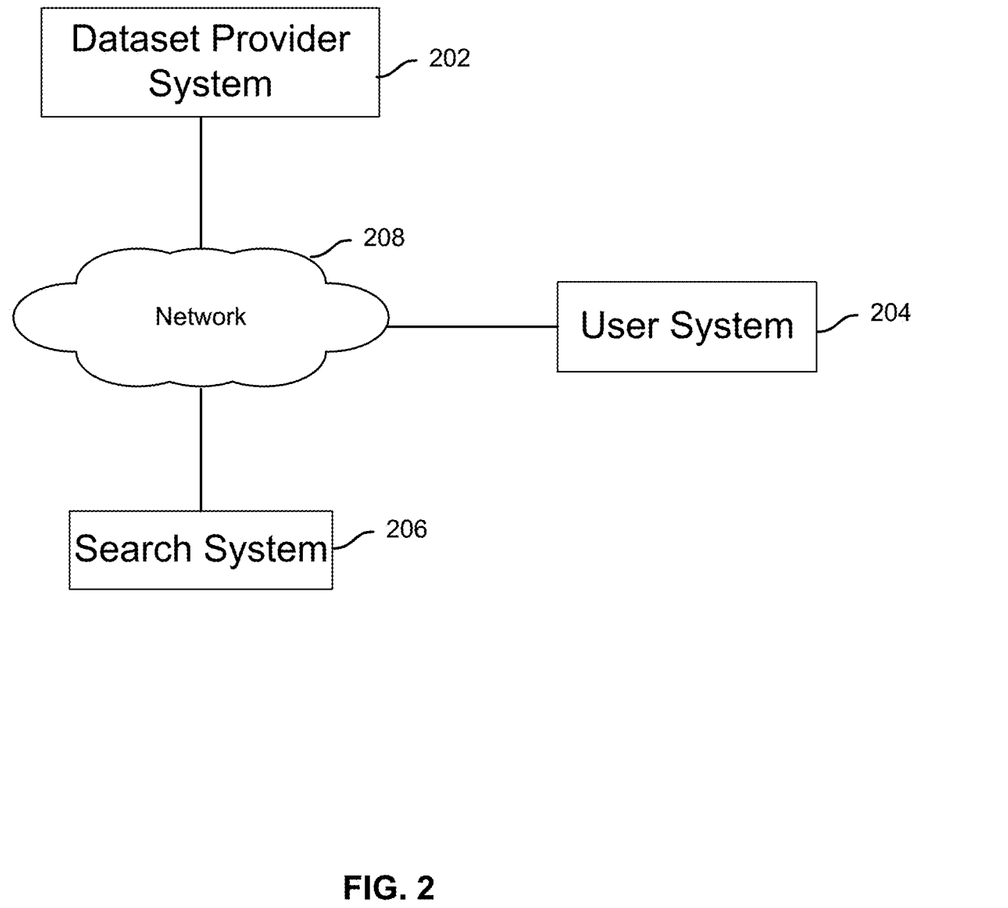
FIG. 2 is a block diagram illustrating an embodiment of a system for indexing datasets.

FIG. 2 is a block diagram illustrating an embodiment of a system for indexing datasets. Search system 206 is connected to dataset provider system 202 and user system 204 via network 208. Search system 206 receives datasets to be indexed from dataset provider system 202. For example, dataset provider system 202 uploads information describing products to search system 206 to allow search system 206 to build a search index to allow the products to be searched using search queries. In addition to indexing the text content included the provided datasets, additional information associated with the datasets is generated and indexed by search system 206. For example, images associated with a dataset are analyzed using image recognition (e.g., using computer vision, artificial neural network, deep learning, etc.) to extract additional information about the dataset. The new information may be outputted as tags to be associated with the respective dataset and indexed for search. In some embodiments, generating the tags includes utilizing text content included in the dataset to guide/supplement image recognition. For example, text content and image content are utilized together as inputs to an artificial neural network to generate the tags.

In some embodiments, hierarchical classifiers are utilized in generating the tags. For example, there exists a hierarchy of classifiers and a lower level classifier is only utilized if a higher level classifier has detected sufficient information that matches the lower level classifier. For example, a higher level classifier detects a product category associated with a dataset and for each possible detected product category, there exists one or more lower level classifiers specific to the detected category. There may be any number of levels of the hierarchy of classifiers. Using the results of the hierarchical classifier, a search index is generated to enable search of the datasets. An example of the search index includes an inverted index that indexes the generated tags as well as text information included in datasets. The generated search index may be provided to another system that will process search queries and/or may be utilized by search system 206 to process search queries.

User system 204 provides search queries to be processed to identify desired data of the datasets. The search queries may be handled by any system that has access to the generated search index. For example, the search queries may be handled by search system 206, dataset provider system 202, and/or any other server/system with access to the generated search index. In some embodiments, handling a search query includes processing the search query to understand the search terms of the query and their relationships (e.g., determine ontology of the search terms) and using the search index to identify one or more datasets matching the processed search query.

Examples of dataset provider system 202 and search system 206 include one or more servers, computers, storage devices, network services, networks, computers, and/or other computer/network devices. For example, search system 206 includes a group of servers and network storage devices. Examples of user system 204 include a laptop computer, a desktop computer, a smartphone, a tablet computer, an Internet of Things device, a wearable computer, a wireless repeater, a wireless router, or any other wireless computer or device.

Examples of network 208 include one or more of the following: a direct or indirect physical communication connection, a mobile communication network, a wireless network, Internet, intranet, Local Area Network, Wide Area Network, Storage Area Network, and any other form of connecting two or more systems, components, or storage devices together. Other communication paths may exist and the example of FIG. 2 has been simplified to illustrate the example clearly. Although single instances of the components shown in FIG. 2 have been shown to simplify the diagram, additional instances of any of the components shown in FIG. 2 may exist. For example, any number of client systems and dataset provider systems may access search system 206 via network 208. Components not shown in FIG. 2 may also exist.

Figure 3:
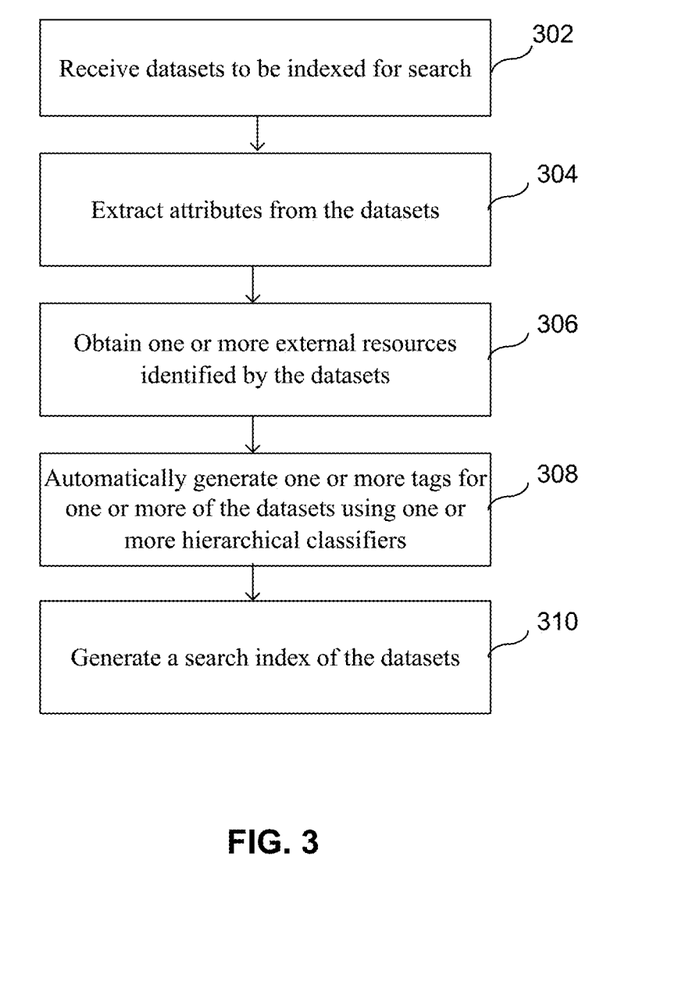
FIG. 3 is a flowchart illustrating an embodiment of a process for generating a search index.

FIG. 3 is a flowchart illustrating an embodiment of a process for generating a search index. The process of FIG. 3 may be implemented on search system 206 of FIG. 2.

At 302, datasets to be indexed for search are received. In some embodiments, each dataset includes information about a specific product. For example, each dataset includes one or more of the following information about a subject of the dataset: a color, a price, a text description, a title, an image, an image location, a review, a comment, a category identifier, a related product identifier, and any other information/attribute associated with the subject. In some embodiments, each dataset corresponds to a different product. Other examples of the dataset include advertisement data, video data, and any other content to be searched. In some embodiments, each dataset is a document and a plurality of documents is received. In some embodiments, the datasets are provided by a remote system (e.g., system 202 of FIG. 2) via a network. For example, a remote system uploads the datasets to a search indexing system for analysis and indexing. In some embodiments, the datasets are provided using an Application Programming Interface (API) provided by a search system. In some embodiments, the datasets are encoded in JavaScript Object Notation (JSON) format. In some embodiments, receiving the datasets includes receiving a network location address where at least a portion of the datasets may be obtained. In some embodiments, the datasets are placed in a processing queue. For example, in order to efficiently and fairly handle processing of a large number of datasets, the datasets are placed in one or more processing queues. In some embodiments, datasets from different providers/merchants are placed in different processing queues and datasets are processed from each processing queue in first-in-first-out order.

At 304, attributes are extracted from the datasets. In some embodiments, extracting the attributes includes extracting data records included in the datasets to be indexed for search. For example, the dataset is read and parsed to convert content of the dataset into a format for search indexing. In some embodiments, the extracting the attributes includes extracting text data included in each dataset. For example, metadata (e.g., data label) and associated text content (e.g., text content describing a subject/product of the dataset) are obtained from the dataset.

At 306, one or more external resources identified by the datasets are obtained. In some embodiments, one or more network location addresses (e.g., URI) of one or more external resources are identified in the datasets. For example, each dataset includes data records associated with a subject (e.g., a product) and one or more of the data records indicate a network address where an external resource (e.g., image) of the subject may be obtained. In some embodiments, obtaining the one or more external resources includes downloading the external resources via a network. For example, image(s) located at the location address(es) are downloaded and stored for analysis. In some embodiments, one or more images may be included in the datasets and the included images are extracted from the datasets for analysis. Examples of the external resources include an image, a video, a file, an audio, and any other content accessible via a network. In some embodiments, the obtained external resources are stored in a local storage. In some embodiments, the obtained external resources are placed in a processing queue for processing.

At 308, one or more tags for one or more of the datasets are automatically generated using one or more hierarchical classifiers. The generated tags are associated with corresponding datasets. For example, a tag includes one or more text terms that describe a subject of a corresponding dataset (e.g., tag identifies a product category, inferred attributes of a product, etc.), and the tag is generated for the corresponding dataset by recognizing content of an image of the subject of the dataset. In some embodiments, the hierarchy of hierarchical classifiers are organized in a hierarchical dependent order. For example, each hierarchical classifier processes an input data to determine one or more outputs. One or more of these outputs may be inputs to a lower level hierarchical classifier and/or may be generated tag(s) to be associated with a dataset. Whether a classifier will be utilized may be dependent on whether a higher level classifier has generated a result (e.g., with at least a threshold level of confidence) that corresponds to the specific lower level classifier. For example, once a classifier has identified a certain tag (e.g., tagged as "jewelry") to be associated with a dataset, other sub tags (e.g., "ring," "gold," etc.) that relate to the certain tag are generated using one or more lower level classifiers that are only utilized in the event the certain tag has been identified by the higher level classifier. Any number of levels of classifiers may exist and each sub level may include one or more classifiers that are selectively utilized based on a result of an immediately higher level classifier.

In some embodiments, each hierarchical classifier may include one or more artificial neural networks and/or machine learning models trained with hand-curated features. For example, artificial neural networks that have been trained using training data are utilized to perform image recognition of an image of a dataset. In some embodiments, inputs to a hierarchical classifier include both image data (e.g., obtained in 306) and text content specified in a dataset (e.g., attribute extracted in 304). For example, image recognition of the image is aided by text content included in the dataset.

At 310, a search index of the datasets is generated. In some embodiments, index ready documents of the dataset are generated and the index ready documents include the tags identified in 308. These index ready documents may be indexed to generate the search index. In some embodiments, generating the search index includes indexing one or more attributes extracted in 304 and tags generated in 308. For example, the extracted attributes and generated tags are both utilized together to generate the search index. In some embodiments, the search index includes an inverted index. For example, keywords of one or more extracted attributes and generated tags are mapped by the inverted index to one or more subjects (e.g., products) of the datasets. The search index may be utilized to determine results of a search query. For example, keywords of the search query are identified and the subjects of the datasets that correspond to the keywords are identified using the search index.

Figure 4:
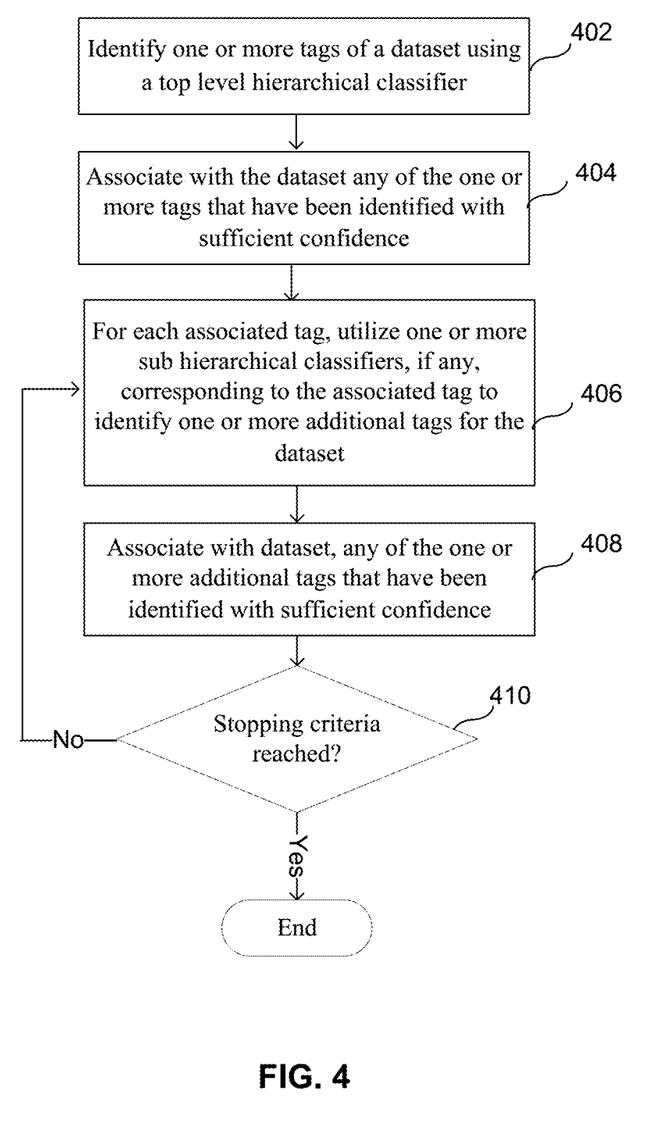
FIG. 4 is a flowchart illustrating an embodiment of a process for automatically generating one or more tags of a dataset.

FIG. 4 is a flowchart illustrating an embodiment of a process for automatically generating one or more tags of a dataset. The process of FIG. 4 may be implemented on search system 206 of FIG. 2. In some embodiments, the process of FIG. 4 is included in 308 of FIG. 3. In some embodiments, the process of FIG. 4 is repeated for each dataset to be processed. For example, received datasets to be processed have been placed in a processing queue and the process of FIG. 4 is utilized to process each dataset in an order of the processing queue.

At 402, one or more tags of a dataset are identified using a top level hierarchical classifier. For example, a category classification of a dataset is identified using a hierarchical top level classifier. In some embodiments, there exists a plurality of potential categories and one or more categories among the potential categories that the dataset is associated with are selected among the potential categories. For example, a subject of the dataset is a product and a product category (e.g., clothing, jewelry, electronics, beauty, toy, automotive, etc.) of the product is automatically determined. Although the dataset may already include an identifier of a categorization of the product, the determined category classification may correspond to a different categorization scheme associated with hierarchical classifiers. In some embodiments, each hierarchical classifier may utilize as inputs one or more text data included in the dataset and an image of the dataset. For example, a product category is determined using both an image of the product and a product title included in the dataset. The top level hierarchical classifier may be one of a plurality of top level hierarchical classifiers that are utilized for every dataset.

At 404, any of the one or more tags that have been identified with sufficient confidence is associated with the dataset. For example, when identifying a tag for the dataset, an indicator (e.g., numerical value) of the confidence that the tag correctly corresponds to the subject of the dataset is determined. In some embodiments, in the event a confidence indicator of a tag meets a threshold (e.g., threshold value), the tag is associated with the dataset. For example, by associating the tag, the tag has been essentially generated for the dataset because the information identified by the tag was not previously specified in the dataset. Associating the tag with the dataset may include mapping the tag to a subject of the dataset to allow a search query associated with the tag to be matched with the subject of the dataset. In some embodiments, associating the tag includes selecting a tag among a plurality of tag options that has been identified by the classifier (e.g., select tag that is mostly likely to be associated with the dataset). In some embodiments, in the event no tag has been identified with sufficient confidence, a tag identifying this no tag determination (e.g., "unknown" tag) is associated with dataset. This "unknown" tag may be utilized to deprioritize a product associated with the dataset in a search ranking.

At 406, for each associated tag, one or more sub hierarchical classifiers, if any, corresponding to the associated tag are utilized to identify one or more additional tags for the dataset. For example, there exists a hierarchical organization of classifiers and whether a particular classifier will be utilized to generate a tag for a dataset depends on whether a higher level classifier with a hierarchical relationship to the particular classifier has identified an output (e.g., a tag with sufficient confidence) that corresponds to the particular classifier. Thus a previously identified tag that has been identified with sufficient confidence may trigger the one or more sub hierarchical classifiers to generate one or more additional tags associated with the previously identified tag. For example, because a higher level classifier has identified a subject of the dataset as a "ring" with a high degree of confidence and associated the "ring" tag with the dataset, one or more sub classifiers are triggered based on the "ring"

tag. These sub classifiers may generate one or more tags describing the type of stone, if any, of the ring, a metal material of the ring, a size of the ring, whether the ring is engraved, etc. In some embodiments, a tag is not associated with a sub level classifier and the tag does not trigger processing of a sub classifier. In some embodiments, a tag is associated with a plurality of sub classifiers and an identification of the tag triggers a plurality of classifiers. One classifier may identify a plurality of tags. Examples of tags identified by a hierarchical classifier include a color of a specific object component included in an image, a property of a color, a quality of a color, a darkness or lightness of a color, a feature of a clothing, a neckline of a clothing, a length of a dress clothing, a sleeve property of a clothing, etc.

At 408, any of the one or more additional tags that have been identified with sufficient confidence is associated with the dataset. In some embodiments, in the event a confidence indicator (e.g., numerical value determined by a classifier) of an identified tag meets a threshold (e.g., threshold value), the tag is associated with the dataset. Associating the additional tag with the dataset may include mapping the additional tag to the dataset to allow a search query associated with the tag to be matched with the subject of the dataset. In some embodiments, associating the tag includes selecting a tag among a plurality of tag options that has been identified by the classifier as mostly likely to be associated with the dataset.

At 410, it is determined whether a stopping criteria has been reached. For example, the stopping criteria has not been reached because there exists one or more additional hierarchical classifiers triggered by one or more of the additional tags and a next sub level of classifiers is to be executed.

In some embodiments, there exists a plurality of levels of classifiers and when the lowest level has been reached, the stopping criteria has been met. In some embodiments, the stopping criteria has been reached when none of the additional tags are associated with the dataset in 408 or the associated tag(s) in 408 do not trigger other classifiers. If at 410 it is determined that the stopping criteria has not been reached, the process returns to 406, where for each of the additional tag(s) that has been associated, one or more sub hierarchical classifiers, if any, corresponding to the associated tag are utilized to identify one or more additional tags for the dataset. If at 410 it is determined that the stopping criteria has been reached, the process ends.

Figure 5:
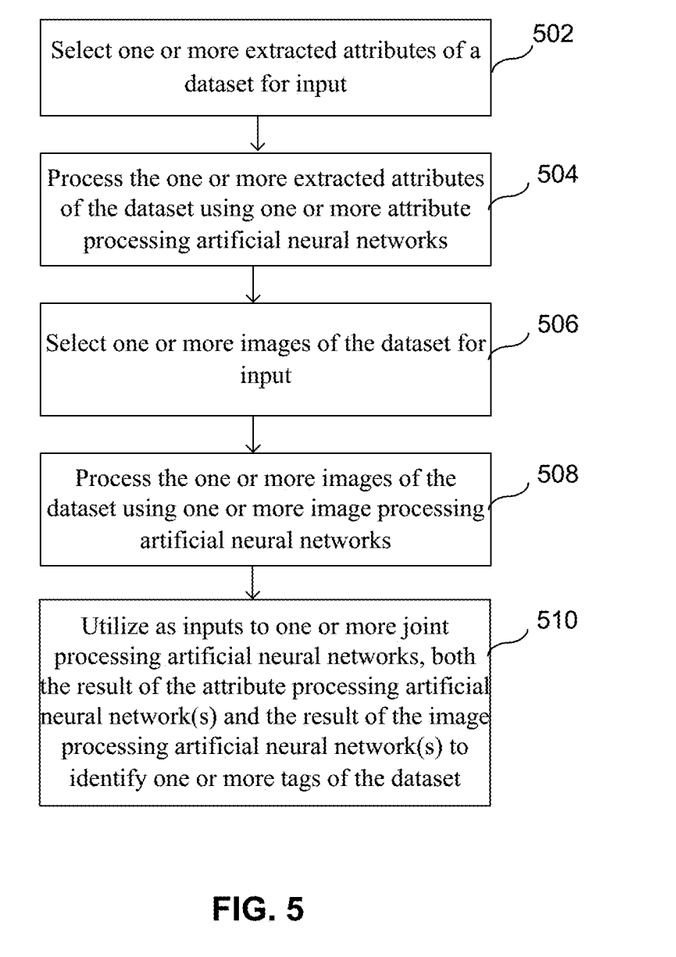
FIG. 5 is a flowchart illustrating an embodiment of a process for utilizing an artificial neural network to identify one or more tags.

FIG. 5 is a flowchart illustrating an embodiment of a process for utilizing an artificial neural network to identify one or more tags. The process of FIG. 5 may be implemented on search system 206 of FIG. 2. In some embodiments, the process of FIG. 5 is included in 308 of FIG. 3. In some embodiments, the process of FIG. 5 is repeated when each hierarchical classifier is utilized to identify tags in the process of FIG. 4.

At 502, one or more extracted attributes of a dataset are selected for input. For example, a hierarchical classifier includes a plurality of neural networks and one or more extracted attributes (e.g., extracted in 304 of FIG. 3) that are applicable to tags to be identified by the hierarchical classifier are selected as input. In some embodiments, text data included in the dataset is selected. For example, the text data is a text title specified in the dataset. Other examples of the text data include at least a portion of a text description included in the dataset.

At 504, the one or more extracted attributes of the dataset are processed using one or more attribute processing artificial neural networks. In some embodiments, a type of neural network that will yield the best results is selected as the attribute processing neural network and one or more of the attribute processing artificial neural networks are utilized to process the attributes to generate an output. Examples of the attribute processing artificial neural network include neural networks best suited to recognize desired properties of text data. An example of the output includes data that can be provided to another neural network to identify one or more tags for the dataset. Examples of the attribute processing artificial neural network include one or more of the following: an autoencoder, a convolutional neural network, a recursive neural network, a recurrent neural network, a fully connected neural network, a Long Short Term Memory neural network, a memory network, and a neural Turing machine. In some embodiments, the attribute processing artificial neural network(s) have been trained using example training data. For example, backpropagation has been utilized to train the attribute processing artificial neural network(s). A plurality of attribute processing artificial neural networks may process data in stages by feeding an output of one attribute processing neural network as an input to another attribute processing neural network.

At 506, one or more images of the dataset are selected for input. For example, an image referenced by the dataset and obtained in 306 of FIG. 3 is selected for input. In some embodiments, the selected image is included in the dataset. In some embodiments, a selected image is a portion of video. In some embodiments, the selected image may depict a subject of the dataset and the image is selected for input for image recognition to generate additional tags for the dataset.

At 508, the one or more images of the dataset are processed using one or more image processing artificial neural networks. In some embodiments, a type of neural network that will yield the best results for image detection is selected as the image processing neural network and one or more of the image processing artificial neural networks are utilized to process the images to generate an output. Examples of the image processing artificial neural network include neural networks best suited to recognize images. An example of the output includes data that can be provided to another neural network to identify one or more tags for the dataset. Examples of the image processing artificial neural network include one or more of the following: convolutional neural network, recurrent convolutional neural network, and restricted Boltzmann machine. In some embodiments, the image processing artificial neural network(s) have been trained using example training data. For example, backpropagation has been utilized to train the image processing artificial neural network(s). A plurality of image processing artificial neural networks may process data in stages by feeding an output of one image processing neural network as an input to another image processing neural network.

At 510, the result of the attribute processing artificial neural network(s) and the result of the image processing artificial neural network(s) are both utilized as inputs to one or more joint processing artificial neural networks to identify one or more tags of the dataset. For example, the output of 504 and the output of 508 are both inputted together to the joint processing artificial neural network to discover one or more tags for the dataset. By utilizing both the image data and descriptive text data, accuracy of the identified tags of the dataset may be improved. The joint processing artificial neural networks may be organized in stages that utilize an output of one joint processing neural network as input of another joint processing neural network. In some embodiments, identifying the tags includes determining whether one or more eligible generated tags able to be detected by the joint processing artificial neural network(s) correspond to the inputs. The eligible generated tags may be preconfigured and/or automatically detected/generated.

In some embodiments, the joint processing artificial neural networks have been trained using example training data. The accuracy of the joint processing artificial neural networks may be continually improved using backpropagation. The attribute processing artificial neural networks, the image processing artificial neural networks, and the joint processing artificial neural networks may be trained together. In some embodiments, identifying the tags includes determining a measure of confidence for each identified tag that identifies the predicated accuracy of the tag and only if the measure of confidence meets a threshold is the identified tag associated with the dataset. In some embodiments, the identified tags are provided in 308 of FIG. 3, 402 of FIG. 4, and/or 406 of FIG. 4.

Figure 6:
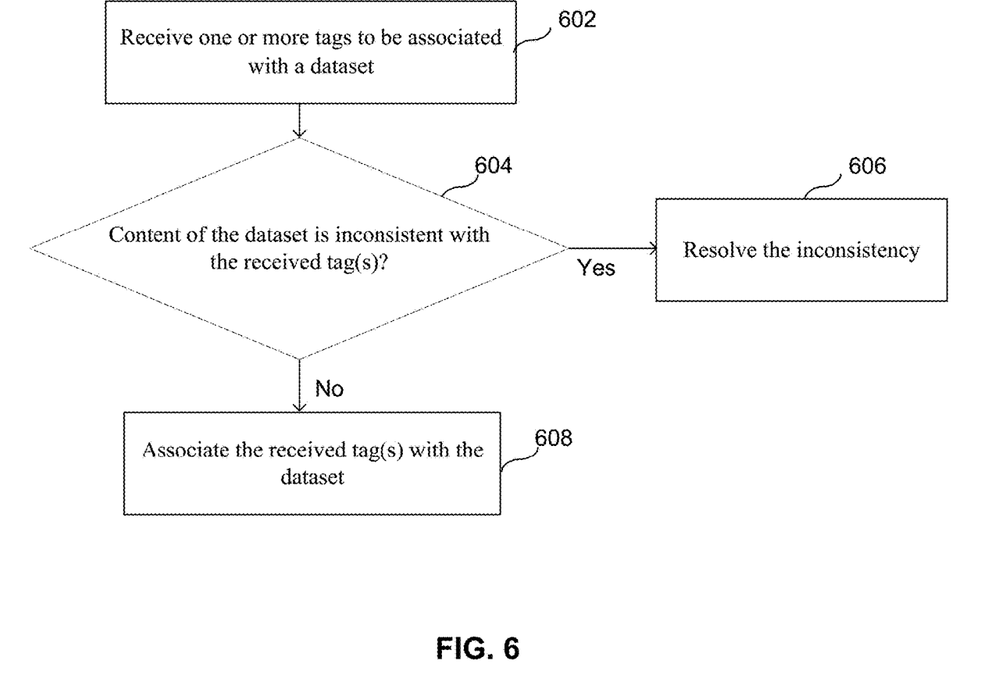
FIG. 6 is a flowchart illustrating an embodiment of a process for resolving an inconsistency of a dataset with a generated tag.

FIG. 6 is a flowchart illustrating an embodiment of a process for resolving an inconsistency of a dataset with a generated tag. The process of FIG. 6 may be implemented on search system 206 of FIG. 2. In some embodiments, the process of FIG. 6 is included in 308 of FIG. 3. In some embodiments, the process of FIG. 6 is included in 404 and/or 408 of FIG. 4.

At 602, one or more tags to be associated with a dataset are received. In some embodiments, the received tags include a tag identified in 308 of FIG. 3, 402 of FIG. 4 and/or 406 of FIG. 4.

At 604 it is determined whether content of the dataset is inconsistent with the received tag(s). For example, a text description or other data record included in the dataset may be incorrect due to human data entry error (e.g., clothing product described as "red" in color in the dataset when the actual clothing product is "blue" in color as evidenced by photographs of the product referenced by the dataset). In some embodiments, determining the inconsistency includes verifying that each tag is consistent with a text attribute included in the dataset. The text attribute of the dataset may be the attribute extracted in 304 of FIG. 3.

If at 604 it is determined that an inconsistency exists, at 606, the inconsistency is resolved. In some embodiments, resolving the inconsistency includes indicating the inconsistency to allow a human reviewer to resolve the inconsistency. In some embodiments, resolving the inconsistency includes modifying content of the dataset to be consistent with the inconsistent tag. In some embodiments, resolving the inconsistency includes removing the inconsistent portion of the dataset. In some embodiments, resolving the inconsistency includes determining not to associate the inconsistent tag with the dataset. For example, a tag is only associated with a dataset if the identified tag is determined to be not inconsistent with the existing attribute of the dataset and/or a previously associated tag of the dataset.

If at 604 it is determined that an inconsistency does not exist, at 608, the received tag(s) are associated with the dataset.

Figure 7:
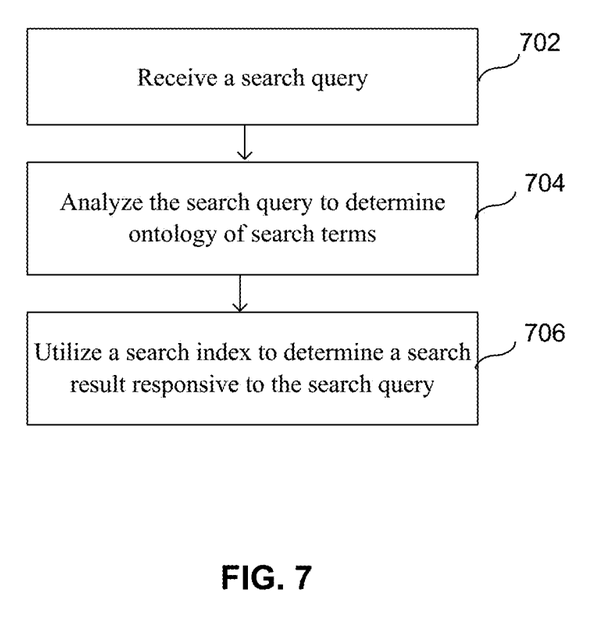
FIG. 7 is a flowchart illustrating an embodiment of a process for processing a search query.

FIG. 7 is a flowchart illustrating an embodiment of a process for processing a search query. The process of FIG. 7 may be implemented on search system 206 of FIG. 2.

At 702, a search query is received. In some embodiments, the search query is a query to identify one or more products that match a specified constraint of the search query. In some embodiments, the search query is a query to search the datasets received in 302 of FIG. 3. In some embodiments, the search query is received from user system 204 of FIG. 2. Other examples of the search query include a query to find a location within a video that includes content matching the search query, a query to search a related image and/or video advertisement, or a query to search for a matching image among a group of images.

At 704, the search query is analyzed to determine ontology of search terms of the search query. For example, the search query is parsed and meaning and relationship between search terms are analyzed and determined to perform a search for desired content specified by the search query. In some embodiments, the search query is vectorized to determine a vectorized representation of the terms of the search query.

At 706, a search index is utilized to determine a search result responsive to the search query. In some embodiments, the search index is the search index generated in 310 of FIG. 3. In some embodiments, the search index has been generated by indexing one or more attributes of datasets and automatically generated tags, and the semantic terms of the search query are matched to content referenced in the search index.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system, comprising:
a processor; and
a memory coupled with the processor, wherein the memory is configured to provide the processor with instructions which when executed cause the processor to perform operations comprising:
retrieving an image and text data that are both presented in a particular listing of a particular object;
generating, using one or more hierarchical classifiers, a first set of tags based on the image presented in the particular listing of the particular object;
generating a second set of tags that differ from the first set of tags based on the text data presented in the particular listing of the particular object;
determining that there is an inconsistency between (i) a particular tag in the first set of tags generated based on the image presented in the particular listing of the particular object and (ii) a different tag in the second set of tags generated based on the text data presented in the particular listing of the particular object based, at least in part, on a determination the different tag generated based on the text data describes a visual trait of the particular object in a different way than the particular tag describes how the visual trait of the particular object is visually depicted by the image presented in the particular listing;
resolving the inconsistency based on a comparison of the particular tag and the different tag to the text data and visual characteristics extracted from the image of the particular object;
generating a search index based at least on generated tags from the first set of tags and the second set of tags that remain following resolving the inconsistency;
receiving a search query comprising one or more search terms;
utilizing the search index to determine that a search result identifying the particular object is responsive to the search query based on the one or more search terms matching the generated tags that remain following resolving the inconsistency; and
returning a search result that presents the image and the text data, wherein:
determining that there is an inconsistency between (i) a particular tag in the first set of tags generated based on the image presented in the particular listing of the particular object and (ii) a different tag in the second set of tags generated based on the text data presented in the particular listing of the particular object comprises determining that the different tag describes the visual trait as having a first color and determining that the particular tag describes the visual trait as having a second color that differs from the first color.

2. The system of claim 1, wherein the instructions further cause the processor to perform operations comprising obtaining the image from a remote network location address identified by a dataset.

3. The system of claim 1, wherein the image is a graphical depiction of the particular object.

4. The system of claim 3, wherein the text data includes at least a portion of a description of the particular object graphically depicted by the image.

5. The system of claim 1, wherein one classifier of the one or more hierarchical classifiers has identified a previously identified tag that triggered another classifier of the one or more hierarchical classifiers generate the second set of tags.

6. The system of claim 1, wherein at least one hierarchical classifier included in the one or more hierarchical classifiers is conditionally executed based on a result of a higher level hierarchical classifier that is also included in the one or more hierarchical classifiers.

7. The system of claim 1, wherein the instructions cause the processor to perform operations comprising:
processing the image using a first artificial neural network;
processing the text data using a second artificial neural network; and
using a result of the first artificial neural network and a result of the second artificial neural network as inputs to a third artificial neural network.

8. A method, comprising:
retrieving an image and text data that are both presented in a particular listing of a particular object;
generating, by one or more processors using one or more hierarchical classifiers, a first set of tags based on the image presented in the particular listing of the particular object;
generating a second set of tags that differ from the first set of tags based on the text data presented in the particular listing of the particular object;
determining, by one or more processors, that there is an inconsistency between (i) a particular tag in the first set of tags generated based on the image presented in the particular listing of the particular object and (ii) a different tag in the second set of tags generated based on the text data presented in the particular listing of the particular object based, at least in part, on a determination that the different tag generated based on the text data describes a visual trait of the particular object in a different way than the particular tag describes how the visual trait of the particular object is visually depicted by the image presented in the particular listing;
resolving, by one or more processors, the inconsistency based on a comparison of the particular tag and the different tag to the text data and visual characteristics extracted from the image of the particular object;
generating, by one or more processors, a search index based at least on generated tags from the first set of tags and the second set of tags that remain following resolving the inconsistency;
receiving a search query comprising one or more search terms;
utilizing, by one or more processors, the search index to determine that a search result identifying the particular object is responsive to the search query based on the one or more search terms matching the generated tags that remain following resolving the inconsistency; and
returning, by one or more processors, a search result that presents the image and the text data, wherein:
determining that there is an inconsistency between (i) a particular tag in the first set of tags generated based on the image presented in the particular listing of the particular object and (ii) a different tag in the second set of tags generated based on the text data presented in the particular listing of the particular object comprises determining that the different tag describes the visual trait as having a first color and determining that the particular tag describes the visual trait as having a second color that differs from the first color.

9. The method of claim 8, further comprising obtaining the image from a remote network location address identified by a dataset.

10. The method of claim 8, wherein the image is a graphical depiction of the particular object.

11. The method of claim 10, wherein the text data includes at least a portion of a description of the particular object graphically depicted by the image.

12. The method of claim 8, wherein one classifier of the one or more hierarchical classifiers has identified a previously identified tag that triggered another classifier of the one or more hierarchical classifiers generate the second set of tags.

13. The method of claim 8, wherein at least one hierarchical classifier included in the one or more hierarchical classifiers is conditionally executed based on a result of a higher level hierarchical classifier that is also included in the one or more hierarchical classifiers.

14. The method of claim 8, further comprising:
processing the image using a first artificial neural network;
processing the text data using a second artificial neural network; and
using a result of the first artificial neural network and a result of the second artificial neural network as inputs to a third artificial neural network.

15. A non-transitory computer readable storage medium storing instructions that, when executed by one or more processors, cause the one or more processors to perform operations, comprising:
retrieving an image and text data that are both presented in a particular listing of a particular object;
generating, by one or more processors using one or more hierarchical classifiers, a first set of tags based on the image presented in the particular listing of the particular object;
generating a second set of tags that differ from the first set of tags based on the text data presented in the particular listing of the particular object;
determining that there is an inconsistency between (i) a particular tag in the first set of tags generated based on the image presented in the particular listing of the particular object and (ii) a different tag in the second set of tags generated based on the text data presented in the particular listing of the particular object based, at least in part, on a determination that the different tag generated based on the text data describes a visual trait of the particular object in a different way than the particular tag describes how the visual trait of the particular object is visually depicted by the image presented in the particular listing;

resolving, by one or more processors, the inconsistency based on a comparison of the particular tag and the different tag to the text data and visual characteristics extracted from the image of the particular object;

generating, by one or more processors, a search index based at least on generated tags from the first set of tags and the second set of tags that remain following resolving the inconsistency;

receiving a search query comprising one or more search terms;

utilizing, by one or more processors, the search index to determine that a search result identifying the particular object is responsive to the search query based on the one or more search terms matching the generated tags that remain following resolving the inconsistency; and returning, by one or more processors, a search result that presents the image and the text data, wherein:
determining that there is an inconsistency between (i) a particular tag in the first set of tags generated based on the image presented in the particular listing of the particular object and (ii) a different tag in the second set of tags generated based on the text data presented in the particular listing of the particular object comprises determining that the different tag describes the visual trait as having a first color and determining that the particular tag describes the visual trait as having a second color that differs from the first color.

16. The non-transitory computer readable storage medium of claim 15, wherein the instructions cause the one or more processors to perform operations comprising obtaining the image from a remote network location address identified by a dataset.

17. The non-transitory computer readable storage medium of claim 15, wherein the image is a graphical depiction of the particular object.

18. The non-transitory computer readable storage medium of claim 17, wherein the text data includes at least a portion of a description of the particular object graphically depicted by the image.

19. The non-transitory computer readable storage medium of claim 15, wherein one classifier of the one or more hierarchical classifiers has identified a previously identified tag that triggered another classifier of the one or more hierarchical classifiers generate the second set of tags.

20. The non-transitory computer readable storage medium of claim 15, wherein at least one hierarchical classifier included in the one or more hierarchical classifiers is conditionally executed based on a result of a higher level hierarchical classifier that is also included in the one or more hierarchical classifiers.

* * * * *

UNITED STATES PATENT AND TRADEMARK OFFICE
CERTIFICATE OF CORRECTION

PATENT NO. : 11,809,393 B2
APPLICATION NO. : 16/799292
DATED : November 7, 2023
INVENTOR(S) : Andrew Stanton et al.

It is certified that error appears in the above-identified patent and that said Letters Patent is hereby corrected as shown below:

In the Claims

Column 10, Line 49, in Claim 1, after "determination" insert -- that --.

Signed and Sealed this
Nineteenth Day of March, 2024

Katherine Kelly Vidal
*Director of the United States Patent and Trademark Office*